US005989677A

United States Patent [19]

Stuhler et al.

[11] Patent Number: 5,989,677

[45] Date of Patent: *Nov. 23, 1999

[54] VISCOSE PLUSH

[76] Inventors: Josef Stuhler, Ob der Aach 1, d-87509 Immenstadt; Peter Schmitt, Westendstr. 13, D-86836 Untermeitingen; Gunther Schonfelder, Am Eckschachen 16, D87509 Immenstadt, all of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,946

[22] Filed: May 20, 1997

[30] Foreign Application Priority Data

Apr. 26, 1997 [DE] Germany ........................... 197 17 764

[51] Int. Cl.$^6$ ................................ B32B 3/02; D02G 3/00

[52] U.S. Cl. ............................ 428/92; 428/358; 428/397; 428/400

[58] Field of Search .............................. 428/92, 358, 397, 428/400

[56] References Cited

U.S. PATENT DOCUMENTS

| | | | |
|---|---|---|---|
| 4,149,849 | 4/1979 | Koch et al. | 8/31 |
| 4,179,259 | 12/1979 | Belitsin et al. | 428/461 |
| 4,381,325 | 4/1983 | Masuda et al. | 428/91 |
| 5,744,236 | 4/1998 | Rohrbach et al. | 428/397 |

FOREIGN PATENT DOCUMENTS

| | | |
|---|---|---|
| 177730 | of 1953 | Australia . |
| 0632990 | of 1994 | European Pat. Off. . |
| 1785237 | of 1972 | Germany . |
| 2726485 | of 1978 | Germany . |
| 7809969 | of 1978 | Germany . |
| 8604525 | of 1986 | Germany . |
| 8909621 | of 1989 | Germany . |
| 3926524 | of 1991 | Germany . |
| 9306485 | of 1993 | Germany . |
| 19510676 | of 1996 | Germany . |
| 29512702 | of 1996 | Germany . |
| 29613983 | 1/1998 | Germany . |
| 607816 | 9/1948 | United Kingdom . |

OTHER PUBLICATIONS

"Textile Terms and Definitions," 9th ed., The Textile Institute, Manchester, UK, pp. 197, 237, 248, and 366–367, 1991.

"Internationally Agreed Methods for Testing Regenerated Cellulose and Acetate Staple Fibers," BISFA, 1970 ed., p. 66, 1970.

"Textile Fabrics and Their Selection," 8th ed., I.B. Wingate and J.F. Mohler, pp. 366 and 338, 1984.

"Introductory Textile Science," 5th ed., M.L. Joseph, p. 85, 1986.

APS search of USPTO database printout.

Japanese Abstract JP 03028241A.

Japanese Abstract JP 05247101.

Partial description of the references No translations.

*Primary Examiner*—Jenna Davis
*Assistant Examiner*—Cheryl Juska

[57] ABSTRACT

A viscose plush comprising warp threads, fill threads and pile threads, each composed of viscose. The pile threads have longitudinal grooves on their surface. And the longitudinal grooves of adjacent pile threads combine to form capillary channels to suck in foreign substances axially.

18 Claims, 1 Drawing Sheet

VISCOSE PLUSH

BACKGROUND OF THE INVENTION

This invention relates to a viscose plush for specific applications. The viscose is 100% cellulose and does not need surfactants to reduce the surface tension of liquids, especially of water. Without such a reduction in the surface tension, water droplets bead off surfaces without forming a film. It is only when the surface tension of the water is reduced that a water droplet is capable of uniformly wetting a surface and of detaching soil particles present thereon. There are already 100% woven viscose cleaning cloths in existence. However, these known cloths additionally require chemical cleaning agents not only for cleaning soiled surfaces but also for the subsequent cleaning of these cloths themselves.

SUMMARY OF THE INVENTION

It is an object of the present invention to provide a viscose plush which, without chemical agents, is capable of significantly altering the arrangement of the molecules of liquids with respect to one another, specifically of significantly reducing the surface tension of natural water; and—likewise without any chemical agents—provides very good cleaning and disinfection of surfaces and, subsequently, the viscose plush itself can again be very thoroughly and efficiently cleaned, likewise without any chemical agents being necessary for this purpose. Instead of surfaces, it should also be possible to use the viscose plush to provide very efficient cleaning of gas streams by using the viscose plush as a filter for such gas streams. Cleaning with the viscose plush is so effective that even microorganisms are removed.

The viscose plush comprises a woven fabric composed of warp threads and fill threads and also pile threads woven into the woven fabric and sticking out of the woven fabric transversely thereto. The warp threads consist of viscose staple fiber yarn; the fill threads consist of viscose, preferably modal viscose (modified viscose fibers with a high wet modulus); and the pile threads consist of viscose filament.

In a preferred embodiment, the warp threads consist of Nm 40/2 viscose staple fiber yarn (Nm=metric count) in a thread count of 16.8 ends/cm; the fill threads consist of Nm 20/1 modal viscose in a thread count of 18 picks/cm; the pile threads consist of 330 dtex f30 viscose filament and have a pile height of about 7.5 mm. In this preferred embodiment, the viscose plush consists of 20% of viscose staple fiber yarn from the warp threads, 21% of modal viscose from the fill threads and 59% of viscose filament from the pile threads.

Likewise as a preferred embodiment, the fill threads are dyed, for example red, yellow, green or blue, whereas the warp threads and the pile threads are left in their natural colors. A different color for the pile threads to the color for the warp threads or for the fill threads has the advantage that a cleaned viscose plush has a different color than a soiled viscose plush, so that the user can judge the cleanliness of the viscose plush by its color.

The abbreviations used have the following meanings:

In connection with the viscose staple fiber yarn of the warp threads, "40/2" means that the staple fiber yarn consists of two mutually processed fibers and that 40 m of this staple fiber yarn weigh 1 gram. "16.8 ends/cm" means that 16.8 warp threads are arranged side by side per centimeter.

In connection with the fill threads, "20/1" means that the fill thread consists of a single yarn and that 20 m of this fill thread weigh 1 gram. "18 picks/cm" means that 18 fill threads are arranged side by side per centimeter.

In connection with the pile threads, "330 dtex" means that 10,000 m of the viscose filament yarn weigh 330 grams. "f30" means that the filament yarn consists of 30 individual filaments and that the fiber cross section is angular.

For the fill threads, another viscose material can be used instead of modal viscose.

The viscose material of warp threads, fill threads and pile threads is a pure natural product composed of 100% cellulose.

In modified embodiments, the viscose plush can consist of 15% to 25% of viscose staple fiber yarn as warp threads, 16% to 26% of viscose, preferably modal viscose, as fill threads and 49% to 69% of viscose filament as pile threads.

The warp threads can consist of Nm 20/2 to Nm 60/2 viscose staple fiber yarn coupled with a sett within the range between 12 ends/cm and 20 ends/cm.

The fill threads can consist of Nm 10/1 to Nm 40/1 viscose, preferably modal viscose, and have a sett of 12 picks/cm to 24 picks/cm.

The pile threads can consist of viscose filament within the range from 50 dtex to 1000 dtex and within the range from f20 to f90.

The weight of the viscose plush is preferably about 620 g per linear meter at a width of 1.40 m. The viscose plush has been washed and stabilized and the pile has been laid.

The large multiplicity of pile threads combine to form capillary channels into which capillary forces suck liquid and soil particles and also bacteria and viruses in the thread longitudinal direction when the viscose plush is moist or, particularly, when it is slightly wet. The capillary effects are substantially lost when the viscose plush is immersed in water. As a result, on immersion into water, the viscose plush releases the water, soil particles and microorganisms previously sucked in between the pile threads. Neither the absorption of water or other liquids, soil particles and all the microorganisms by the capillary forces mentioned, nor the subsequent release of the liquid, soil particles and all the microorganisms on immersion of the viscose plush into water, nor the rinsing of the viscose plush with water requires chemical cleaning agents. After the viscose plush has been cleaned and wrung out, its capillary action is restored and it can be re-used. Known cleaning cloths composed of woven viscose have these natural properties only to such a small extent that they require chemical agents and solvents.

This invention is the result of observing how, in nature, plants and their leaves are automatically cleaned without any need for surfactants to reduce their surface tension. It is a prerequisite for the disclosed capillary action between the pile threads of the invention that the viscose filaments of these pile threads have, over their circumference, a multiplicity of grooves extending longitudinally over the entire thread length in the thread longitudinal direction.

Effects and advantages of the invention:

The viscose plush of the invention can be used as a polishing cloth when dry.

To use the viscose plush in accordance with the invention as a cleaning cloth, the viscose plush is first immersed in stationary water, for example in a bucket, for the cleaning task. The water temperature should be not more than 30° C. As a result, the physical property of water is altered so that its surface tension is reduced by 20% to 50%, as a function of the ratio of the surface area of the woven fabric to the water quantity. A viscose plush 0.1 to 0.2 $m^2$ in size is sufficient for 30 to 50 liters of water. Thereafter the viscose plush is removed from the water and wrung out. The merely moist viscose plush can then be used for cleaning surfaces and removing microorganisms. For example, without chemical cleaning agents and without chemical disinfectants or other chemical additives, it is possible to wash the human body, to clean spectacles, to clean windows, to clean floors, to clean instruments, (in medical clinics) to clean and disinfect floors, to clean and disinfect technical instruments and medical instruments, to disinfect wounds of patients, (in the veterinary sector) to clean and disinfect animals, etc. Another area of use for the viscose plush of the invention without any need for chemical cleaning agents or other chemical additives is its use as a filter in gas streams, for example in the exhaust air from equipment employed in the painting of articles, in building air conditioners, as motor vehicle fresh air filters for the passenger compartment of motor vehicles and in gas or air streams of any kind of industrial plant.

The viscose plush has to be cleaned after use. This, too, requires no chemical cleaning agents or other chemical additives whatsoever. It is sufficient to immerse the viscose plush in the water or to rinse it off with water and lightly rub it against itself. This reduces its capillary action and hence also its capillary forces to such an extent that it will release into the surrounding water all the moisture, soil particles and microorganisms previously absorbed in a cleaning or filtering operation and become very clean within a short time without any need for chemical cleaning agents or other chemical additives.

It was explained above that the viscose plush is initially immersed in stationary water to reduce the structure of the molecules with respect to one another and hence the surface tension of the water by 20% to 50%. As a result, the water does not bead off surfaces to be cleaned, but wets such surfaces and detaches soil particles falling thereon and all microorganisms. This is essential for the cleaning process. It will consequently be appreciated that water whose surface tension has been reduced in this way can be used for cleaning surfaces using means other than the viscose plush, for example other cloths or sponges, without chemical cleaning agents or other chemical additives being required for this purpose. However, such other cloths or sponges would not have the self-cleaning properties of the viscose plush of the invention, especially not its capillary properties, and would consequently only be cleanable using chemical cleaning agents.

The water which has been modified with a clean viscose plush need not be used for cleaning purposes, but can also be used for other purposes, for example to improve the taste and aroma of food and drink or to render the water more suitable for industrial applications. The viscose plush of the invention and/or the water whose surface tension has been reduced by it are also excellent means for gently removing of water-soluble cosmetics.

Viscose plush in accordance with the invention can also be used as a fabric cover for bed linen and toys, especially soft toys. These are then readily cleanable without chemical cleaning agents or other chemical additives and particularly hygienic.

BRIEF DESCRIPTION OF THE DRAWINGS

A preferred embodiment of the invention will now be described by way of example with reference to the drawings.

DETAILED DESCRIPTION OF THE INVENTION

Figure 1:
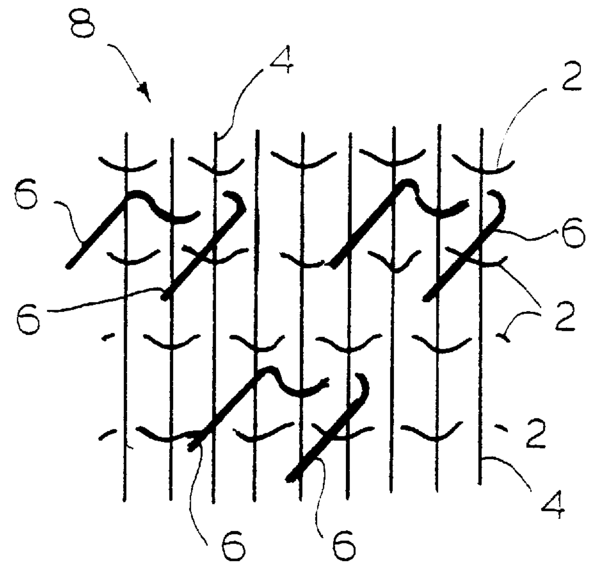
FIG. 1 is a diagrammatic, not-to-scale enlargement of a section of a cloth in accordance with the invention composed of plush made of 100% viscose.
Figure 2:
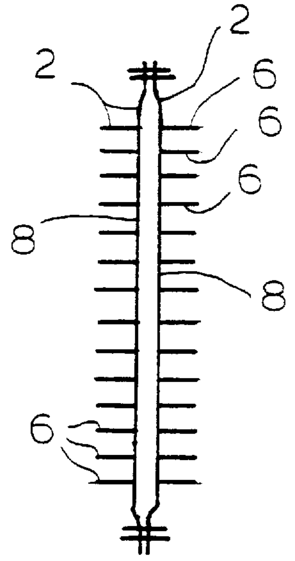
FIG. 2 is a diagrammatic, not-to-scale representation of a double-sided plush.

The viscose plush of the invention consists of warp threads 2, fill threads 4 and interwoven pile threads 6. The pile threads 6 stick out transversely on one side of the woven fabric formed by the warp threads 2 and the fill threads 4. A double-sided plush can be formed in a simple manner by two plush cloths 8 of FIG. 1 arranged back to back as depicted in FIG. 2.

Figure 3:
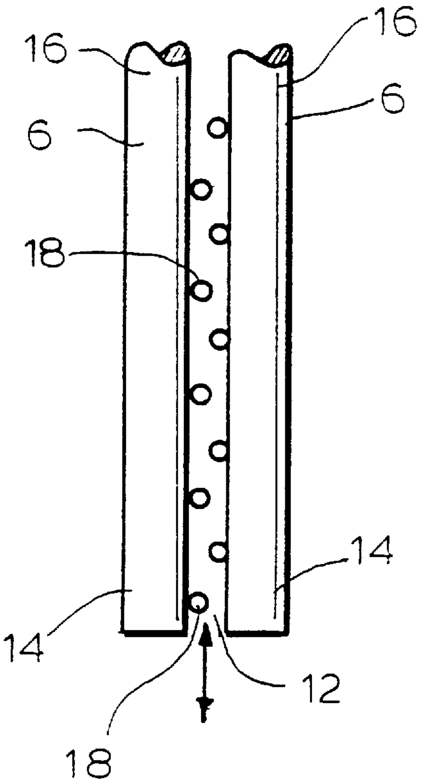
FIG. 3 is a not-to-scale illustration of two pile threads of the viscose plush in accordance with the invention for the purpose of explaining the capillary action between these threads.
Figure 4:
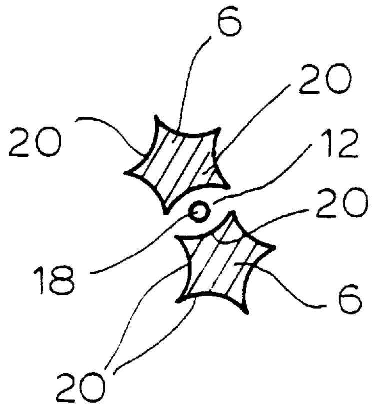
FIG. 4 shows diagrammatic, not-to-scale cross-sectional views of two adjacent pile threads of the viscose plush of the invention.

FIG. 3 shows two adjacent pile threads 6, which combine to form a capillary channel 12 which extends in the longitudinal direction of the threads. The capillary forces arising in the capillary channel 12 draw in foreign substances 18, especially liquid, soil particles and all microorganisms, in the direction from their free end 14 to their inner end 16, attached to the warp threads 2 and fill threads 4, when the viscose plush 8 is moist, but especially when it is slightly wet. When the viscose plush 8 is immersed in water or rinsed off with water, it loses its capillary forces and the foreign substances 18 drop out of the capillary channels without additional agents, for example chemical cleaning agents or solvents, being required.

The surfaces of the warp threads 2, of the fill threads 4 and of the pile threads 6 are very smooth, so that the foreign substances 18 can slip down them and strong adhesion forces cannot arise between these threads 2, 4 and 6 on the one hand and the foreign substances 18.

The pile threads 6 have to have longitudinal flutes 20 extending the entire length in the longitudinal direction. This enhances the capillary action in the capillary channels 12. The longitudinal flutes 20, viewed in cross section, preferably have an arcuate base. The pile threads 6 have a polygonal cross section. The pile threads 6 are preferably interlaced into the fill threads 4 in a W shape.

The warp threads 2, the fill threads 4 and especially the pile threads 6 with the longitudinal flutes 20 together form a huge surface area composed of 100% vegetable raw material, which is many thousands of times larger than the surface area of such a viscose plush cloth when measured along its external edges.

The pile threads 6 consist of natural viscose. The warp threads 2 and the fill threads 4 can consist of artificial viscose, but preferably they likewise consist of natural viscose.

What is claimed is:

1. A viscose plush comprising:

a woven fabric composed of warp threads composed of viscose and fill threads composed of viscose, and;

pile threads woven into said woven fabric and projecting from said woven fabric transversely thereto;

said pile threads comprising viscose filaments and having along their entire length longitudinal grooves on an outer surface, said longitudinal grooves being configured in such a way, and said pile threads having a size and a mutual distance, that said longitudinal grooves of adjacent pile threads combine to form capillary channels to draw in foreign substances.

2. The viscose plush of claim 1, wherein said warp threads comprise viscose staple fiber yarn.

3. The viscose plush of claim 1, wherein said fill threads comprise modified viscose fibers with a high wet modulus.

4. The viscose plush of claim 1, wherein 15% to 25% of the warp threads comprise viscose staple fiber yarn, 16% to 26% of the fill threads comprise modified viscose fibers with a high wet modulus, and 49% to 69% of the pile threads comprise viscose filament.

5. The viscose plush of claim 1, wherein said warp threads are of Nm 20/2 to Nm 60/2 viscose staple fiber yarn.

6. The viscose plush of claim 1, wherein there are 12 to 24 warp threads per centimeter.

7. The viscose plush of claim 1, wherein said warp threads are of Nm 10/1 to Nm 40/1 comprise modified viscose fibers with a high wet modulus.

8. The viscose plush of claim 1, wherein there are 12 to 24 fill threads per centimeter.

9. The viscose plush of claim 1, wherein each pile thread comprises a viscose filament yarn which contains 30 individual filaments and has a weight of 330 grams per 10,000 m.

10. The viscose plush of claim 1, wherein said pile threads have a length extending away from said woven fabric within the range from 6 mm to 9 mm.

11. The viscose plush of claim 1, wherein said warp threads and/or said fill threads have a different color than said pile threads.

12. The viscose plush of claim 1, wherein said pile threads are in their natural color.

13. The viscose plush of claim 1 including 20% warp threads of viscose staple fiber yarn, 21% fill threads of modified viscose fibers with a high wet modulus, and 59% pile threads of viscose filament.

14. The viscose plush of claim 1, wherein said warp threads are of Nm 40/2 viscose staple fiber yarn.

15. The viscose plush of claim 1, wherein there are 16.8 warp threads per centimeter.

16. The viscose plush of claim 1, wherein said fill threads are of Nm 20/1 modified viscose fibers with a high wet modulus.

17. The viscose plush of claim 1, wherein there are 18 fill threads per centimeter.

18. The viscose plush of claim 1, wherein said pile threads have a length extending away from said woven fabric of about 7.5 mm.

* * * * *